US008664790B2

(12) United States Patent
Cornelius et al.

(10) Patent No.: US 8,664,790 B2
(45) Date of Patent: Mar. 4, 2014

(54) UNDERWATER POWER GENERATOR WITH DUAL BLADE SETS

(75) Inventors: Tim Cornelius, Harbour Front Centre (SG); John Keir, Harbour Front Centre (SG); Drew Blaxland, Harbour Front Centre (SG)

(73) Assignee: Atlantis Resources Corporation PTE Limited, Singapore (SG)

( * ) Notice: Subject to any disclaimer, the term of this patent is extended or adjusted under 35 U.S.C. 154(b) by 0 days.

(21) Appl. No.: 13/266,666

(22) PCT Filed: Apr. 28, 2010

(86) PCT No.: PCT/IB2010/001346
§ 371 (c)(1),
(2), (4) Date: Feb. 7, 2012

(87) PCT Pub. No.: WO2010/125476
PCT Pub. Date: Nov. 4, 2010

(65) Prior Publication Data
US 2012/0133140 A1 May 31, 2012

(30) Foreign Application Priority Data

Apr. 28, 2009 (AU) ................................ 2009901850
Sep. 23, 2009 (AU) ................................ 2009904620

(51) Int. Cl.
F03B 13/00 (2006.01)
(52) U.S. Cl.
USPC ........................................... 290/54; 416/124
(58) Field of Classification Search
USPC ........................ 290/53, 54, 42, 43; 416/124
See application file for complete search history.

(56) References Cited

U.S. PATENT DOCUMENTS

| 1,025,929 | A | 5/1912 | Snook |
| 1,371,836 | A | 10/1919 | Antz et al. |
| 2,280,148 | A | 4/1942 | Gardner |
| 3,139,166 | A | 6/1964 | Berlyn |
| 3,464,357 | A | 9/1969 | Duport et al. |
| 3,604,942 | A | 9/1971 | Nelson |
| 3,851,994 | A | 12/1974 | Seippel |
| 3,942,231 | A | 3/1976 | Whitaker |

(Continued)

FOREIGN PATENT DOCUMENTS

| CA | 2 217 826 | 12/2001 |
| CA | 2 438 041 A1 | 2/2002 |

(Continued)

OTHER PUBLICATIONS

Sharkh, SM Abu, et al., "Performance of an Integrated Water Turbine PM Generator," Proceedings of the 14th Interntional Symposium on Power Semiconductor Devices & ICS, pp. 486-491, Apr. 2002.

(Continued)

Primary Examiner — Vanessa Girardi

(57) ABSTRACT

A power generation apparatus for generating power from water flows is described. The power generation apparatus includes: a generator; a first blade set operatively mounted to the generator for rotation in a selected direction in response to flowing water from a selected direction; a second blade set operatively mounted to the generator for rotation and operatively connected to the first blade set, the second blade set being disposed coaxially with, and downstream of or in a wake zone of, the first blade set; wherein the generator is adapted to be driven by at least one of the blade sets, the generator being disposed generally coaxially between the first and second blade sets.

17 Claims, 8 Drawing Sheets

(56) References Cited

U.S. PATENT DOCUMENTS

| | | |
|---|---|---|
| 3,986,787 A | 10/1976 | Mouton, Jr. et al. |
| 3,986,792 A | 10/1976 | Warner |
| 4,021,135 A | 5/1977 | Pedersen et al. |
| 4,064,403 A | 12/1977 | Miller |
| 4,075,500 A | 2/1978 | Oman et al. |
| 4,078,388 A | 3/1978 | Atencio |
| 4,207,015 A | 6/1980 | Atencio |
| 4,256,970 A | 3/1981 | Tomassini |
| 4,258,271 A | 3/1981 | Chappell et al. |
| 4,306,157 A | 12/1981 | Wracsaricht |
| 4,324,985 A | 4/1982 | Oman et al. |
| 4,352,989 A | 10/1982 | Gutierrez Atencio |
| 4,524,285 A | 6/1985 | Rauch |
| 4,531,888 A | 7/1985 | Buchelt |
| 4,594,474 A | 6/1986 | Spinner |
| 4,613,279 A | 9/1986 | Corren et al. |
| 4,722,665 A | 2/1988 | Tyson |
| 5,440,176 A | 8/1995 | Haining |
| 5,474,425 A | 12/1995 | Lawlor |
| 5,506,453 A | 4/1996 | McCombs |
| 5,575,620 A | 11/1996 | Haller et al. |
| 5,921,745 A | 7/1999 | Round et al. |
| 5,929,531 A | 7/1999 | Lagno |
| 5,954,474 A | 9/1999 | Fisher et al. |
| 6,013,955 A | 1/2000 | dos Santos Costa |
| 6,036,443 A | 3/2000 | Gorlov |
| 6,091,161 A | 7/2000 | Dehlsen et al. |
| 6,152,684 A | 11/2000 | Ferme et al. |
| 6,402,477 B1 | 6/2002 | Cybularz et al. |
| 6,476,513 B1 | 11/2002 | Gueorguiev |
| 6,533,536 B1 | 3/2003 | Fisher, Jr. et al. |
| 6,652,221 B1 | 11/2003 | Praenkel |
| 6,766,643 B2 | 7/2004 | Christensen |
| 6,846,160 B2 | 1/2005 | Saito et al. |
| 6,864,594 B2 | 3/2005 | Seki |
| 7,083,378 B2 | 8/2006 | Hur |
| 7,088,012 B2 | 8/2006 | Gizara |
| 7,095,597 B1 | 8/2006 | Cousineau |
| 7,199,484 B2 | 4/2007 | Brashears |
| 7,218,011 B2 | 5/2007 | Hiel et al. |
| 7,352,074 B1 | 4/2008 | Pas |
| 7,354,245 B2 | 4/2008 | Baba |
| 7,372,172 B2 | 5/2008 | Winkler et al. |
| 7,758,300 B2 | 7/2010 | Friesth |
| 7,902,687 B2 | 3/2011 | Sauer et al. |
| 8,206,113 B2 | 6/2012 | Ryynänen et al. |
| 2002/0192068 A1 | 12/2002 | Seksan |
| 2002/0197148 A1 | 12/2002 | Belinsky |
| 2003/0126751 A1 | 7/2003 | Izumi |
| 2004/0041405 A1 | 3/2004 | Seki |
| 2004/0070210 A1 | 4/2004 | Johansen et al. |
| 2004/0191068 A1 | 9/2004 | Richter et al. |
| 2005/0029817 A1 | 2/2005 | Gizara |
| 2005/0285407 A1 | 12/2005 | Davis et al. |
| 2005/0286975 A1 | 12/2005 | Fonfrede et al. |
| 2007/0007772 A1 | 1/2007 | Brashears |
| 2007/0071606 A1 | 3/2007 | Borthwick et al. |
| 2007/0191973 A1 | 8/2007 | Holzbauer et al. |
| 2007/0231072 A1 | 10/2007 | Jennings et al. |
| 2007/0231117 A1 | 10/2007 | Gokhman |
| 2007/0231148 A1 | 10/2007 | Lehoczky |
| 2007/0241566 A1 | 10/2007 | Kuehnle |
| 2007/0284882 A1 | 12/2007 | Costin |
| 2008/0056906 A1 | 3/2008 | Gray et al. |
| 2008/0084068 A1 | 4/2008 | Shibata et al. |
| 2008/0138206 A1 | 6/2008 | Corren |
| 2008/0231057 A1 | 9/2008 | Zeuner |
| 2008/0236159 A1 | 10/2008 | Tierney |
| 2009/0045631 A1 | 2/2009 | Gibberd et al. |
| 2009/0076661 A1 | 3/2009 | Pearson et al. |
| 2009/0123283 A1 | 5/2009 | Corren et al. |
| 2010/0066089 A1 | 3/2010 | Best et al. |
| 2010/0117364 A1 | 5/2010 | Harrigan |
| 2010/0133844 A1 | 6/2010 | Pearce |
| 2011/0176915 A1 | 7/2011 | Keir et al. |
| 2011/0210548 A1 | 9/2011 | Sevenster et al. |
| 2012/0013129 A1 | 1/2012 | Cornelius et al. |
| 2012/0086207 A1 | 4/2012 | Gray |
| 2012/0169057 A1 | 7/2012 | Tonkin |
| 2012/0191265 A1 | 7/2012 | Keir |
| 2012/0200084 A1 | 8/2012 | Blaxland et al. |
| 2012/0202369 A1 | 8/2012 | Blaxland |
| 2012/0267895 A1 | 10/2012 | Blaxland |
| 2012/0280507 A1 | 11/2012 | Keir |

FOREIGN PATENT DOCUMENTS

| | | |
|---|---|---|
| CN | 2528952 | 1/2003 |
| DE | 102 27 404 A1 | 1/2004 |
| DE | 10 2008 000382 | 9/2009 |
| EP | 0 020 207 A1 | 12/1980 |
| EP | 0 223 731 A1 | 5/1987 |
| EP | 1878914 A2 | 9/2007 |
| EP | 1988282 A2 | 11/2008 |
| GB | 1 518 151 | 7/1978 |
| GB | 2 426 295 | 11/2006 |
| GB | 2 437 533 | 10/2007 |
| GB | 2 448 710 | 3/2009 |
| JP | 2002-256810 | 9/2002 |
| KR | 2004107166 | 12/2004 |
| KR | 20070059317 | 6/2007 |
| WO | WO 01/14739 A1 | 1/2001 |
| WO | WO 01/48374 A2 | 7/2001 |
| WO | WO 2005/010353 A2 | 2/2005 |
| WO | WO 2005/061173 | 7/2005 |
| WO | WO 2006/052923 A1 | 5/2006 |
| WO | WO 2007/125349 A2 | 11/2007 |
| WO | WO 2008/100157 A1 | 8/2008 |
| WO | WO 2005/045243 A1 | 5/2009 |
| WO | WO 2009/126995 A1 | 10/2009 |
| WO | WO 2010/125476 A1 | 11/2010 |

OTHER PUBLICATIONS

Schönborn, et al., "Development of a Hydraulic Control Mechanism for Cyclic Pitch Marine Current Turbines," Renewable Energy, Pergamon Press, Oxford, GB, vol. 32, No. 4, pp. 662-679, Apr. 2006.

International Preliminary Report on Patentability for International Application No. PCT/AU2010/001161, mailed Nov. 1, 2011.

Office Action for U.S. Appl. No. 12/993,645, mailed Mar. 29, 2012.

English Translation of Office Action for Korean Patent Application No. 10-2010-7025661, mailed Jul. 19, 2012.

Office Action for Canadian Patent Application No. 2,724,702, mailed Sep. 24, 2012.

Supplemental European Search Report for EP 09 73 2862, mailed Sep. 2, 2011.

Final Office Action for U.S. Appl. No. 12/993,645, mailed Dec. 5, 2012.

Supplemental European Search Report for EP 10769392.1, mailed Feb. 18, 2013.

Supplemental European Search Report for EP 10769393.9, mailed Feb. 28, 2013.

Supplemental European Search Report for EP 09732944.5, mailed Feb. 19, 2013.

International Search Report for International Application No. PCT/AU2009/000457, mailed May 12, 2009.

Written Opinion for International Application No. PCT/AU2009/000457, mailed May 6, 2009.

International Preliminary Report on Patentability for International Application No. PCT/AU2009/000457, mailed Apr. 19, 2010.

International Search Report for International Application No. PCT/AU2009/000458, mailed May 25, 2009.

Written Opinion for International Application No. PCT/AU2009/000458, mailed May 25, 2009.

International Preliminary Report on Patentability for International Application No. PCT/AU2009/000458, mailed Jul. 12, 2010.

(56) References Cited

OTHER PUBLICATIONS

International Search Report and Written Opinion for International Application No. PCT/IB2010/001364, mailed Oct. 7, 2010.
International Search Report and Written Opinion for International Application No. PCT/IB2010/001346, mailed Aug. 26, 2010.
International Search Report and Written Opinion for International Application No. PCT/AU2010/000618, mailed Jun. 24, 2010.
Swenson, W. J., "The Evaluation of an Axial Flow, Lift Type Turbine for Harnessing the Kinetic Energy in a Tidal Flow," Northern Territory Centre for Energy Research, Northern Territory University, Darwin, Australia, Sep. 1999.
Office Action for U.S. Appl. No. 13/394,673, mailed Sep. 9, 2013.

UNDERWATER POWER GENERATOR WITH DUAL BLADE SETS

CROSS REFERENCE TO RELATED APPLICATIONS

This application is a U.S. National Stage Entry and claims priority under 35 U.S.C. §371 of International Patent Application No. PCT/IB2010/001346, filed Apr. 28, 2010, which is hereby incorporated by reference in its entirety. International Patent Application No. PCT/IB2010/001346 claims priority to Australian Application No. 2009901850, filed Apr. 28, 2009 and Australian Patent Application No. 2009904620, filed Sep. 23, 2009.

TECHNICAL FIELD

The present invention relates generally to generation of usable power from the flow of rivers, ocean currents, undersea tidal flows and water flows generally.

BACKGROUND ART

Machines have been proposed for converting and generating power from flows of water, such as for example river flows, ocean currents and tidal flows into usable power, typically electrical power. To increase converted and generated power from these known machines, attempts have been made to make larger machines. These attempts have resulted in exposure of parts and the machines overall to larger machine stresses, and have been counterproductive as a result.

Blade lengths became longer, and examination of loadings on blades, struts and other parts became exceedingly complex fatigue problems. As a result, the parts themselves became expensive and complex, while modelling became expensive and time consuming. Also, the product life is reduced and maintenance cycles become shorter.

The present inventors have developed an underwater power generator apparatus particularly suitable for generation of power from tidal flow and ocean currents.

SUMMARY OF INVENTION

According to one aspect of the present invention there is provided a power generation apparatus for generating power from water flows, the power generation apparatus including:

a generator;

a first blade set operatively mounted to the generator for rotation in a selected direction in response to flowing water from a selected direction;

a second blade set operatively mounted to the generator for rotation and operatively connected to the first blade set, the second blade set being disposed coaxially with, and downstream of or in a wake zone of, the first blade set;

wherein the generator is adapted to be driven by at least one of the blade sets, and the generator disposed generally coaxially between the first and second blade sets.

In some arrangements the coaxially-disposed first and second blade sets are mounted on first and second rotors, respectively. In this arrangement, the first and second rotors are preferably mounted on a shaft assembly which comprises operatively coupled or linked rotor shafts connected together so that the second rotor rotates in the same direction as the first rotor.

In other arrangements a clutch or braking arrangement is provided in order to uncouple the first blade set from the second blade set. Therefore in these arrangements, in operation, the second blade set may be locked with a braking apparatus to a stopped position or uncoupled completely and allowed to rotate freely.

In alternative arrangements a coupling apparatus may be provided between the blade sets which drives the second blade set in an opposite direction to that of the first blade set.

In still further embodiments the generator may be driven by a separate generator shaft operatively coupled to the rotor shafts. The generator shaft may be operatively connected to a gearbox so it rotates at a higher or lower rate than the rotor shafts.

Preferably, however, the first and second rotors directly drive a generator and thus are mounted on a common rotor shaft so that they rotate at the same rate. Preferably, the rotors are mounted on the shaft via a hub with an interference fit or a splined connection.

Preferably there are a plurality of blades provided per blade set. There may be any suitable number of blades provided, such as for example between two and ten. In a preferred form, there are provided three blades per blade set. In preferred arrangements the blades of the second blade set are staggered in terms of angular position relative to the first so that the blades of the second set are not directly shadowed by the blades of the first set when rotating on a common shaft. A preferred factor in selecting the rotation direction is blade disposition and in preferred embodiments the angle of attack of the blades is fixed, however, in some embodiments the blades may be variable in pitch.

In a more preferred form, the two blade sets contain the same number of blades with substantially the same profile and size. Thus, in use, one blade set may eclipse the other blade set.

Optionally, blades of one blade set on one rotor may have a different profile from those blades on the blade set of another rotor, but the blades of both blade sets are preferably identical in number, length, cross section and other major characteristics.

Preferably the first and second rotors are separated by any suitable separation distance. In preferred embodiments, the separation distance is at least a distance that the blades would be considered spaced apart from one another than adjacent one another.

Preferably the blade sets are spaced an effective distance apart, and in a wake field or wake zone, and approximately the length of the diameter (d) of the blades. Testing and modelling indicates that, for optimal operation, an efficient separation distance may vary between about 0.5 d and 10 d.

Advantageously, modelling and testing of preferred embodiments of the present invention indicate that increased power can be gained from a smaller diameter, multiple blade set unit when compared with a larger diameter, single blade set unit. These embodiments may reduce cost/kWH significantly.

Preferably the power generation apparatus is suitable for underwater and marine mounting and use.

The rotors preferably include a nose cone mounted on the front of the rotors to reduce drag on the rotors and reduce turbulent water flow. Preferably the nose cone is hollow to provide space for auxiliary systems such as a control system, or reservoirs for auxiliary or even primary systems.

Embodiments including mono-directional blades, as well as bidirectional-bladed embodiments, may include a rotating system to align the blade sets to a tidal flow which may change attack or flow direction from time to time.

Thus, in one embodiment, the arrangement may be such that a turbine head unit, comprising at least a generator and two above described rotatably mounted blade sets spaced apart along a longitudinal axis is mounted so as to automatically or manually (via electric drive or other means) substantially align itself so that the longitudinal axis of the turbine head unit is parallel with the tidal or attack flow. Thus in this embodiment the turbine head unit is rotatably mounted on a pylon.

Preferably the pylon is substantially vertical, but it may be of any selected suitable orientation, as long as the arrangement is such that the pylon spaces the nacelle from the sea bed a selected distance, far enough to clear the blades from the sea bed when spinning about the rotor. A rotating apparatus is disposed either on the pylon remote from or adjacent the turbine head unit.

The power generation apparatus may be modular. That is, it may be in the form of detachable or releasable modules which may be assembled to one another at suitable stages. The modules may include the turbine head unit, a pylon unit, and a base or support unit. The turbine head unit may be detachably or releasably mounted to the pylon unit. Furthermore, the pylon may be detachably or releasably mounted to the base or support unit for supporting the pylon on a sea or other water body bed.

Preferably the generator is directly connected to one or more of the blade sets or rotor, shafts. Preferably the generator is connected to the or each blade set or rotor shaft by a splined connection.

A cowling or housing may be provided so as to direct water to the blades. The cowling or housing may include a flow channel in which the blade sets are disposed in use, the arrangement being such that the blade tips are disposed adjacent the internal walls of a hollow cylinder. The housing may extend to a position outside or upstream or past the first set of blades and to a corresponding position relative to the second set of blades so as to facilitate improvements in efficiency.

Preferably a flow restriction is provided in the flow channel Advantageously, this arrangement increases the velocity of liquid flowing through the flow channel in a restricted part of the flow channel, relative to an unrestricted part of the flow channel The flow restriction preferably comprises a venturi, which may form part or the entire flow channel In particular, the venturi may comprise a divergent-convergent-divergent venturi, tapering from openings at either end of the flow channel towards an inner part of the flow channel The venturi may comprise at least one first frusto-conical, frusto-pyramid or horn shaped body, optionally a cylindrical body, and an at least one second frusto-conical, frusto-pyramid or horn shaped body.

Preferably the divergent end of the one first/second frusto-conical, frusto-pyramid or horn shaped body is substantially longitudinally coincident with the convergent end of the one further first/second frusto-conical, frusto-pyramid or horn shaped body.

In a preferred embodiment, the housing extends rearward of the rotor and acts as a diffuser, the housing diverging from the throat to a rear opening rearward of the rotor.

Preferably support struts are provided to extend between the rotor and generator, and the housing. Preferably the support struts are hollow to provide ducts or reservoirs. In one arrangement the support struts extend substantially radially between the rotor and generator. In preferred embodiments, a generator end of the support strut is mounted so that the support strut extends substantially tangentially to the generator. This is to improve torque transfer between the generator and the housing, facilitating lighter support struts. Furthermore, an advantage of this preferred arrangement is that fatigue loads on the support struts are reduced since the tangentially-mounted support struts are typically not disposed completely behind, or completely "shadowed" by the radially mounted blades when in use.

Preferably a brake, in use inhibits rotation of the first and/or second rotor and/or rotor shafts. Preferably the brake is a fail-safe mechanism. Preferably in use braking actuator holds a brake element remote from the rotor against an actuation force when power is applied to the brake actuator. In use, when power is removed from the braking actuator, the actuation force, which may be from a spring or from some appropriate other kind of urging force, overcomes the braking actuator's force and applies the braking element to the rotor, slowing or stopping the rotation of the rotor.

Preferably a boot or a plug is provided at the blade root to cover any gaps or bumps or bolt heads and the like to minimise interference drag in that region.

In some arrangements a longitudinal axis of the blades, extending from a blade root or base to a blade tip may be splayed rearward by a rake, splay or tilt angle of about 1° to 20° from a radial plane perpendicular to the longitudinal central axis of the rotor. Preferably the longitudinal axis of the blades is splayed rearward from the blade root to the blade tip by a tilt angle of 2° to 10°, and more preferably by 4° to 6° from the radial plane. Further preferably, the blades are splayed rearward from the blade root to the blade tip by a tilt angle of about 5° from the plane perpendicular to the central axis. In other arrangements the longitudinal axis of the blades is oriented with the radial plane. In these embodiments a leading edge of the blade may be raked rearwards by a rake, splay or tilt angle of about 1° to 20° from the radial plane. This may be true of both first and second bladesets that is, both bladesets may be raked rearwards. It may be that the blades of a downstream (or second) bladeset are raked or twisted more severely than the blades of its upstream or first bladeset.

Furthermore, the trailing edge of the blade may be raked forwards by about the same amount as the leading edge is raked back. The advantage of this arrangement is that it produces a taper and thus reduces bending moments at the blade root.

The blades may be uni (mono-) or bidirectional. They may be any advantageous cross-sectional shape such as flat paddles, an aerofoil, biconvex, tapered or trapezoidal, rectangular, parallel, curved or twisted. In some arrangements the aerofoil shape is a NACA 4412 series cross-sectional shape. The blades provided may be unidirectional, however, in preferred embodiments the blades are bidirectional, the latter so as to obviate a perceived need for a rotating mount for the rotors and blade sets.

The mono- (or unidirectional) blade includes a blade root; a blade tip; a leading edge extending from the blade root to the blade tip; a trailing edge extending from the blade root to the blade tip; a blade root chord defined as a straight line between the leading edge and the trailing edge at the blade root; a blade tip chord defined as a straight line between the leading edge and the trailing edge at the blade tip; wherein the blade tip chord is angularly displaced from the blade root chord by a twist angle of between 50° and 90°.

Preferably, the mono- or unidirectional blade tip chord is angularly displaced from the blade root chord by a twist angle of between 60° and 80°. Further preferably, that blade tip chord is angularly displaced from the blade root chord by a twist angle of between 65° and 75°. Further preferably, that blade tip chord is angularly displaced from the blade root chord by a twist angle of about 70°.

The blade can be manufactured from any suitable material utilising a mould process using fibre reinforced plastics or other compounds, but can alternatively be fabricated using structural ribs and sheet skin from steel, non-ferrous alloys or fibre reinforced plastics. Preferably, the blade is made of composite material.

In some embodiments the blade may be a bidirectional turbine blade. Preferably the blade comprises a blade root and blade tip; a first face and a second face running between the blade root and blade tip; a cross-sectional profile which is symmetrical about a chord line extending between longitudinal edges of the blade; and a twist of between about 5° and 35° from the chord line, wherein the blade is capable of driving an underwater turbine from water flowing at the first face or the second face.

The bidirectional blade may be any suitable symmetrical cross-sectional profile, including flat, double wedge and hexagonal (modified double wedge). In preferred embodiments, to facilitate increased lift and reduced drag, the cross-sectional profile is BiConvex, which is an elliptical profile shape.

Preferably the bidirectional blade's twist is about a central longitudinal axis of the blade, or at a midpoint of the chord line along the blade length, so that the overall twisted blade shape is symmetrical.

Preferably the overall twist is of the bidirectional blades is in a range of about 10 to 20 degrees. In one preferred embodiment the twist is about 14 degrees from blade root to tip. Testing and modeling by the inventors indicates twist ranges between about 5 and 35 degrees being efficient and useful with other preferred features of the invention.

Preferably the blade faces are tapered so that the longitudinal edges are raked rearwards, that is to say inwards toward the central longitudinal axis. In preferred embodiments the taper is such that a length of the chord at the blade tip is approximately 10% shorter than the length of the chord at the blade root. Testing and modeling by the inventors indicates that a range of tapers may be useful and efficient in this blade design, say, between about 2 and 30%.

When installed in a turbine, the bidirectional blade is disposed such that an intermediate portion of the blade is angled to the central axis of the turbine at approximately 45°. This means that when installed, the preferred blade twists toward the incoming water flow by several degrees in a root or proximal blade region and away from the flow or rearward or downstream by several degrees in a tip or distal blade region.

Preferably the bidirectional blades are fixed in pitch so that they are unable to rotate about their longitudinal axes and change their angle of attack to the water flow. The blades may rotate in either direction, depending on the water flow direction, and the generator thus generates power when the blade sets are rotating in any direction. A control system may be provided for controlling the power generation apparatus which may include a means for measuring an activity affecting operation of the power generation apparatus; means for altering operation of the turbine; and a data processing apparatus comprising a central processing unit (CPU), a memory operably connected to the CPU, the memory containing a program adapted to be executed by the CPU, wherein the CPU and memory are operably adapted to receive information from the measuring means and implement an instruction to the altering means to alter the operation of the power generation apparatus.

Preferably, the control system controls the turbine to optimize power generation in a given water flow rate. Typically, the flow rate is less than about 10 knots, less than about 8 knots, less than about 6 knots or between about 1 and 5 knots. The water flow rate may be tidal, river flow, outflow, or current in an ocean or sea. The system can be used for controlling a water turbine installed in an environment with low flow rates of less than about 5 knots to provide optimum power or electricity generation. The system can be used to control a turbine up to about 8 knots.

Preferably, the activity affecting output of the turbine is selected from water velocity (rate), water flow direction, relative position to water flow, load, torque, height or position in water, rotor blade or foil speed, rotor blade or foil lift, rotor blade or foil drag, torque, power output, electricity generated, power load, or the like.

The turbine may be altered in one or more ways to respond to measured inputs including attitude positioning relative to water flow direction, adjusting height or depth, orientation, altering rotor blade or foil speed, altering upstream or downstream blade set rotational speed, power load, altering torque, transfer of power, or the like. Preferably, the rotation speed or power load of or on either upstream or downstream blade set is altered using a variable speed drive (VSD) positioned in association with the turbine or system. In one preferred arrangement, the VSD is located on the pylon or mounting structure of the power generating system. The VSD preferably controls or monitors power in many ways including reactive power and the like to the generator to affect output load or torque from the generator.

There are some situations where external power can be used to initiate or continue rotor rotation at a minimum or desired speed to ensure optimum power generation. As a turbine system is attached to a power grid, the control system can initiate the drawing of power from the grid to power up the turbine if required.

Preferably the means for measuring an activity is one or more of the following and may be in combination with others of the following: a sonar device for detecting potential or actual obstructions; means for measuring an activity in the form of a current profiler; a thermocouple for measuring the temperature of ambient air or ambient water or motor temperature, or hydraulic oil temperature; a transducer receiving angular or height measurements relating to yaw or linear positioning of the turbine; one or more underwater or above-water cameras for detecting potential or actual obstructions; one or more transducers for measuring turbine speed or power generated, volts generated, phase generated; tide information; a fuse, connection or relay check routine; and combinations thereof.

The power generation apparatus according to preferred embodiments of the present invention can be mounted in a marine environment where the first rotor faces the direction of an incoming tidal flow and the second rotor faces the direction of an outgoing tidal flow such that both rotors are driven by incoming and outgoing tidal flows. It will be appreciated that the power generation apparatus can be positioned in the opposite arrangement relative to tidal flow. In these embodiments a rotate unit does not need to be provided to rotate the power generation apparatus in order to allow power generation from incoming and outgoing tidal flows.

According to another aspect of the present invention there is provided a method of generating power from water flow, the method comprising:

providing a power generation apparatus according to the first-defined aspect of the present invention to a marine or river environment;

allowing water movement through the power generation apparatus to cause the blades to rotate; and drawing usable power from the power generation apparatus.

Preferably a pylon or support is provided upon which the generator apparatus and turbine is mounted. In some preferred embodiments the pylon is mounted between the rotors so as to reduce interference to water when it first strikes one or other of the rotors. The pylon is preferably streamlined. In some alternative arrangements the pylon includes arms extending therefrom, preferably horizontally, so as to mount two or more power generation apparatus as described above, side by side, to increase power generated.

According to still another aspect of the present invention there is provided a power generation system for generating power from water flows, the system including a plurality of power generating apparatus according to the first-defined aspect of the present invention.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

In order that the present invention may be more clearly understood, preferred embodiments will be described with reference to the following drawings and examples.

DETAILED DESCRIPTION OF THE PREFERRED EMBODIMENT

Figure 1:
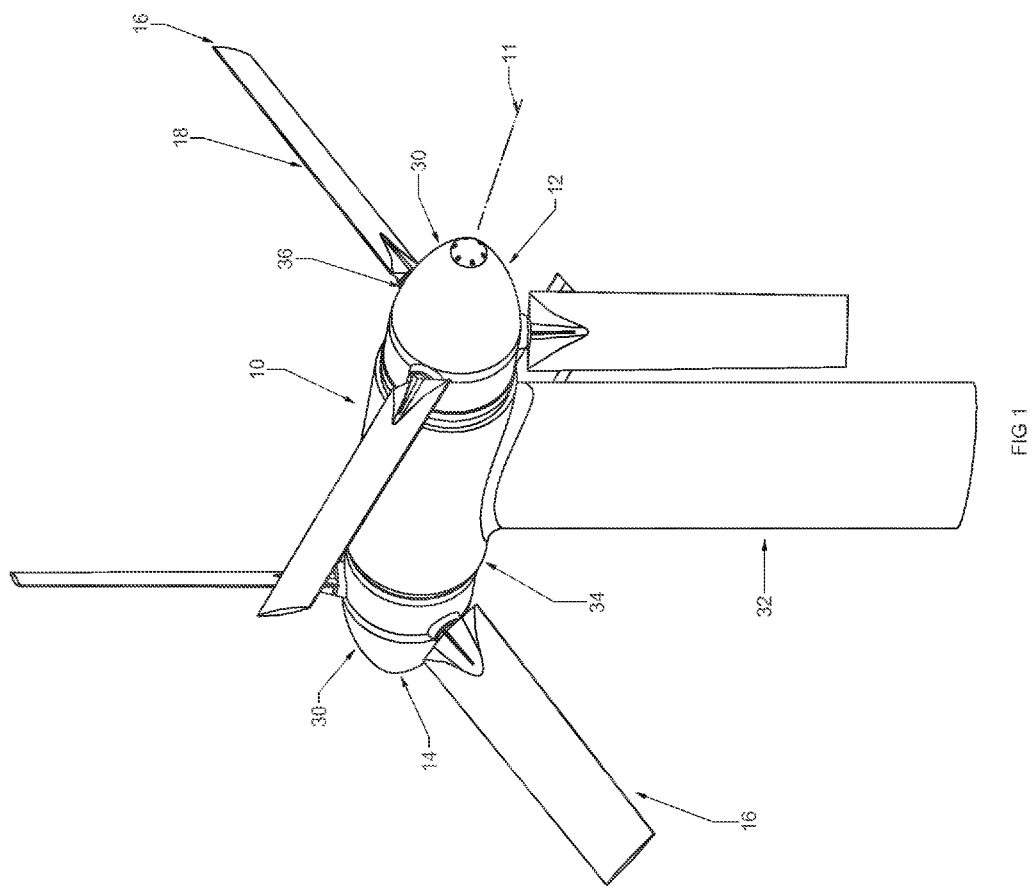
FIG. 1 is a perspective view viewed from one end, above and to one side of a power generation apparatus in accordance with a preferred embodiment of the present invention.
Figure 2:
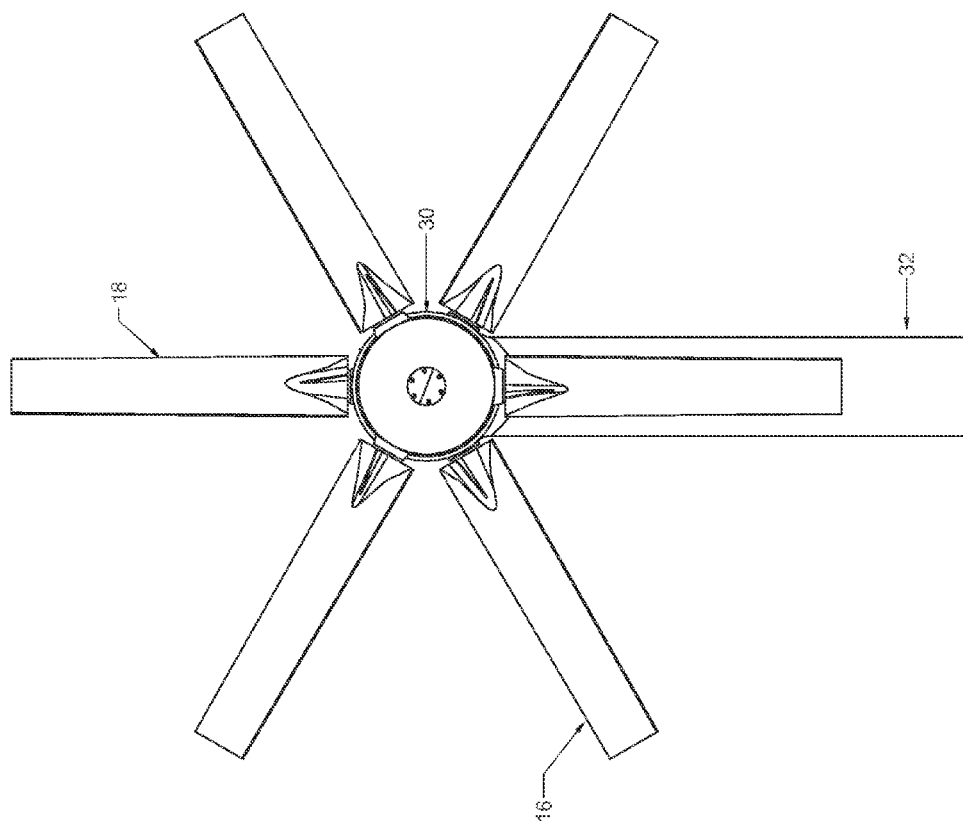
FIG. 2 is a front elevation view of the power generation apparatus of FIG. 1.
Figure 3:
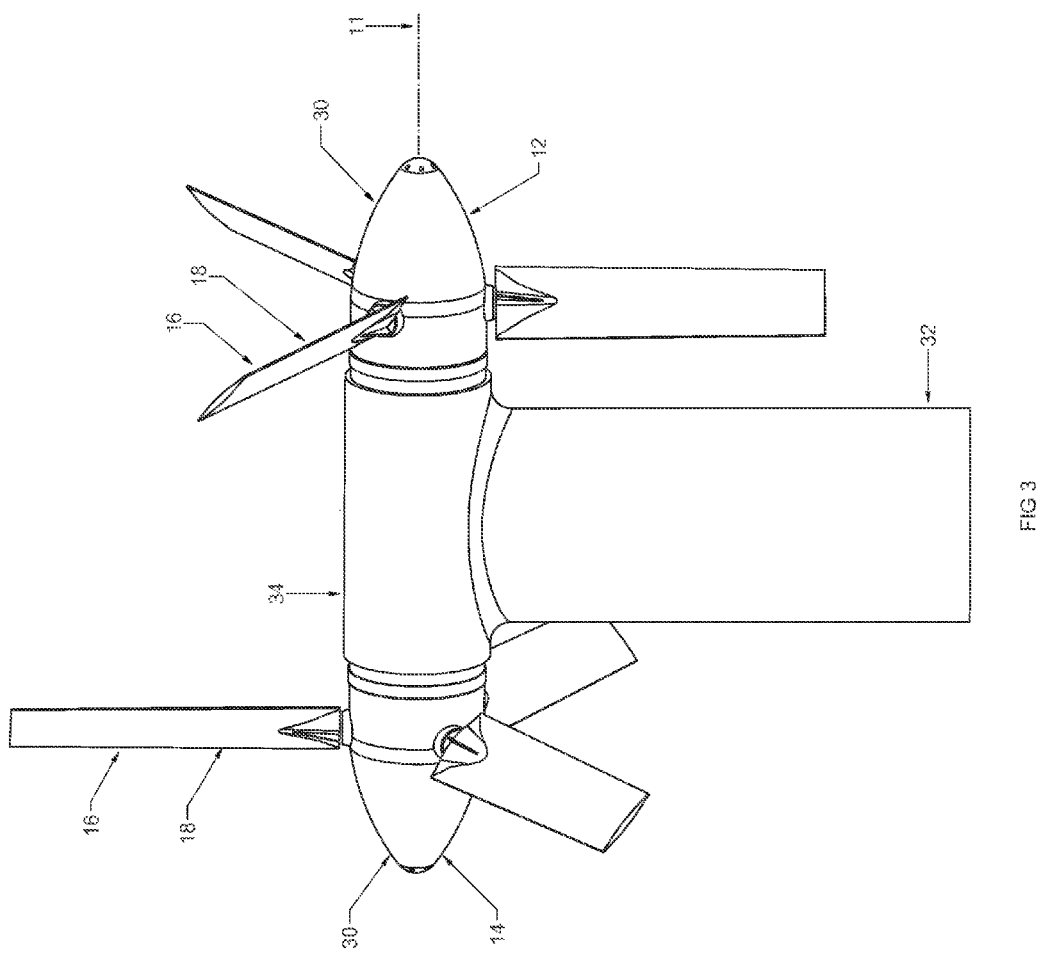
FIG. 3 is a combination side perspective view of the power generation apparatus of FIG. 1.
Figure 4:
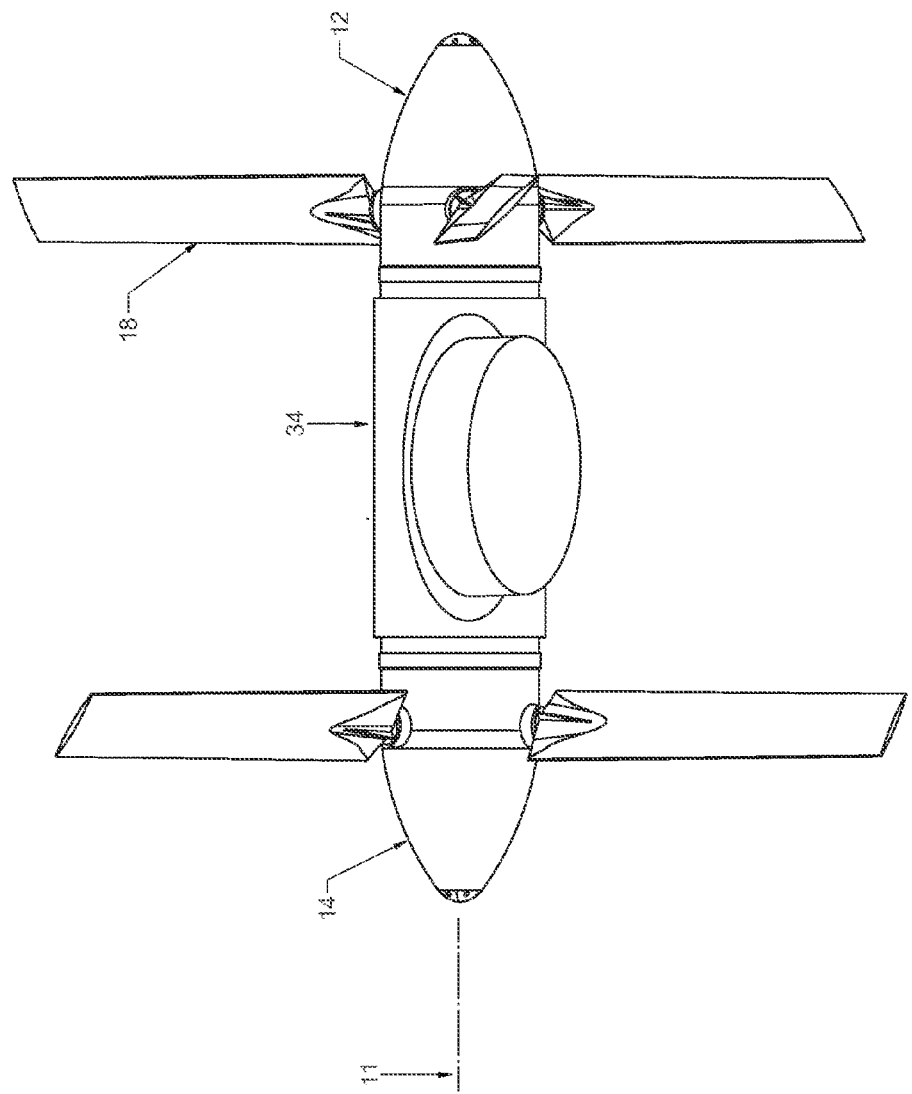
FIG. 4 is an underside view of the power generation apparatus of FIG. 1.
Figure 5:
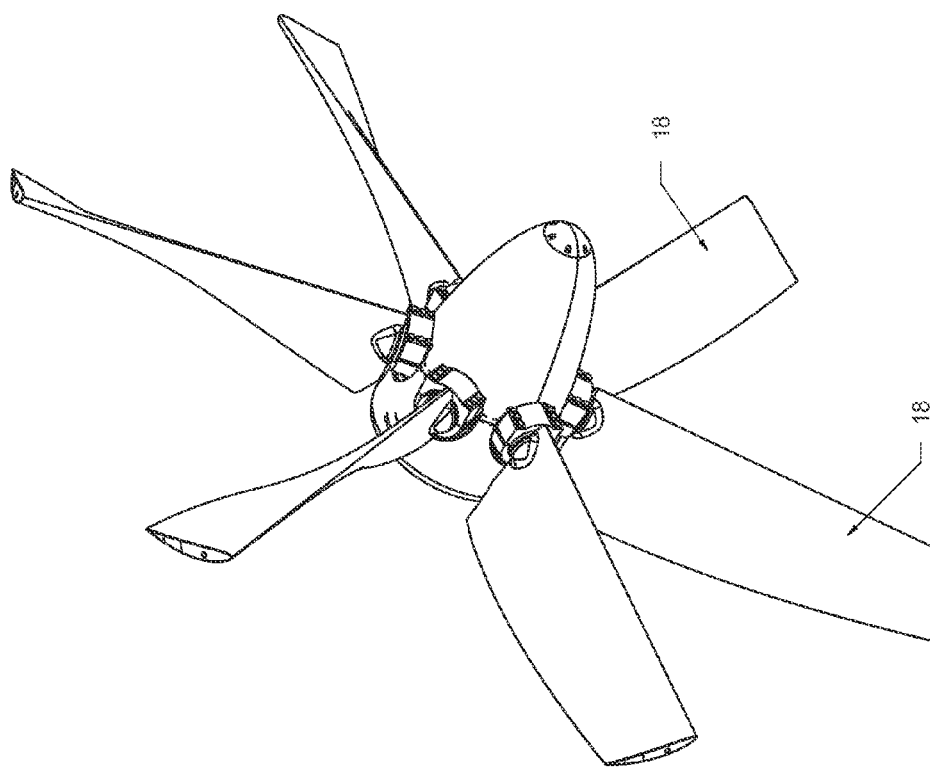
FIG. 5 is a perspective view of a first blade set which may be mounted on they power generation apparatus of FIG. 1.

Referring to the drawings there is shown a power conversion or generation apparatus generally indicated at 10, the power generation apparatus 10 being for converting water flow into usable electrical power and being immersed in water when in operation.

The power generation apparatus 10 includes a turbine head unit 5 having a central longitudinal axis 11, and further comprising a turbine comprising a first blade set or rotor 12 rotatably mounted for rotation in response to incident water flow disposed at a first end 13 of the power generation apparatus 10 and a second blade set or rotor 14 at a second end of the power generation apparatus 10 similarly rotatably mounted. A generator 34 is disposed between the first and second blade sets. The power generation apparatus 10 is generally installed so that the central longitudinal axis 11 extends in a direction parallel with a water flow direction.

In use, the second rotor 14 is disposed in a downstream position relative to the first rotor 12. Furthermore, the second rotor 14 is disposed coaxially and directly downstream of the first rotor 12 and in the wake zone of the first rotor 12.

Figure 6:
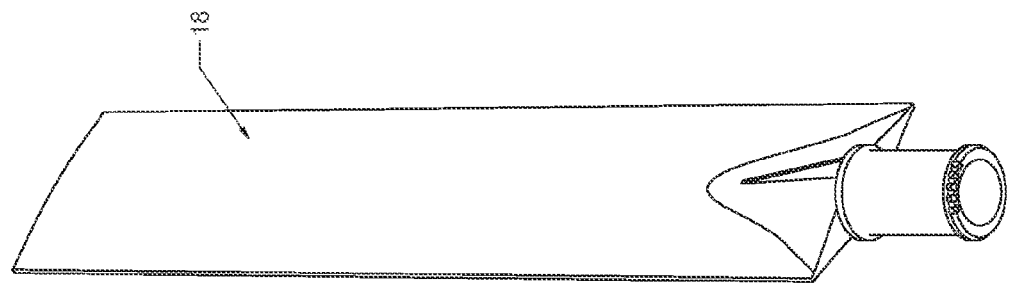
FIG. 6 is a perspective view of a blade which may be mounted on the first blade set of FIG. 1.

The first and second blade sets or rotors 12, 14 include blade arrangements or blade sets 16 integral with or mounted thereon and which comprise a plurality of blades 18. The blades 18 may be any type of blade, and in one arrangement the blades 18 are uni-directional (as shown in FIG. 6). These blades show a high degree of twist as above described. The rotor shown in FIG. 6 may be used so that the blade sets face outwards as shown at each end, or one may face inwards. Alternatively, the pitch of the blades is variable and completely reversible.

Figure 7:
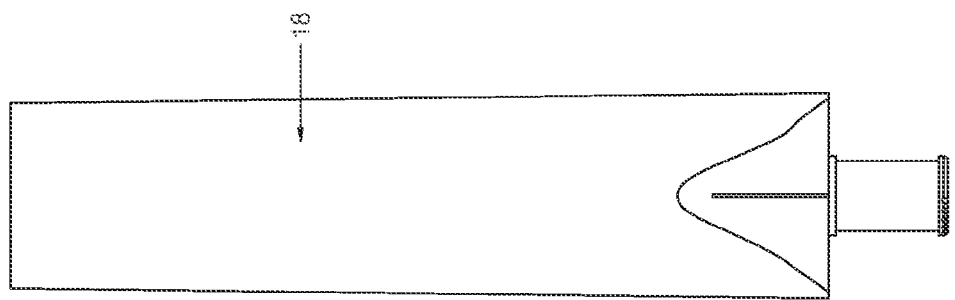
FIG. 7 is another perspective view of the blade of FIG. 6.
Figure 8:
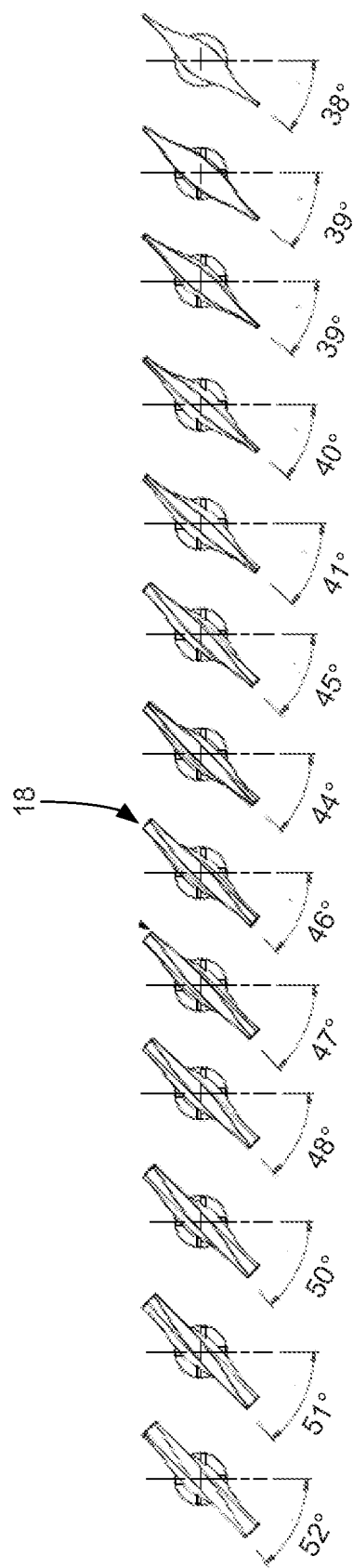
FIG. 8 shows a plurality of section views along the blade of FIGS. 6 and 7.

Preferably, however, the blades 18 are bidirectional (cf all other Figures, but in detail shown in FIGS. 6-8) so that the blades may work as well if the water strikes the blades from one side or the other.

Although in operation the wake zone is a disturbed flow zone, the second blade set may be advantageously utilised to increase the efficiency of the energy harvest from that wake zone. However, when sited in reversing flows, the generation apparatus 10 may be arranged so that both the first and second bladesets are adapted to be upstream bladesets. In the case of monodirectional blades this arrangement may be such that the blades are reversibly mounted relative to one another. Thus, in one arrangement the blades would be such that each blade would be angled towards the generator a selected rake angle as above described. It may also be in that situation that the trailing bladeset is locked or free to rotate, since that bladeset may not improve the overall efficiency of the generating machine when run effectively backwards. However, it is also possible and contemplated that both bladesets are arranged so that the second bladeset is designed to be always a downstream bladeset and thus would be disposed similarly to the upstream bladeset (ie in the case of a rake, if that is most efficient, both rakes would be at corresponding angles to one another ie both raked in the same direction). This latter arrangement would most likely require a rotating turbine head.

The blades 18 are mounted on each rotor and disposed thereabout at equal angular spacings. There are three blades 18 provided per rotor. The blades 18 on the second rotor 14 are disposed so that they are in a staggered position relative to the blades on the first rotor 12, when the rotors are mounted on a common shaft (not shown) so that one blade is not shadowed by another blade when in use.

The rotors 12, 14 may be mounted on a common shaft as discussed above, or may be mounted on separate or operatively linked shafts. The shafts may be linked by a gearbox to increase or decrease the relative speed of the second rotor 14 relative to the first rotor 12 if required for increased efficiency. The rotors 12, 14 shown, however, are used in the preferred embodiments of turbine 10, and are mounted on the same shaft with an interference fit or a splined connection (all not shown), but which in either or any case, fix the rotating speeds of the rotors 12, 14 to be common with one another and maintains the angular staggering of the blades 18 between the rotors 12, 14.

The blade sets or rotors 12, 14 may be selectively uncoupled so that one blade set freely rotates relative to the other and a brake may be provided to selectively lock one blade set or the other. It is also possible to operatively connect the two blade sets or rotors so that they rotate in opposite directions from one another.

The power generation apparatus 10 may be provided with a rotation unit (not shown), which may rotate the unit up to 180 degrees, which is more valuable when the turbine 10 is installed with uni-directional blades 18, but may be of some use when fitted with bidirectional blades 18. For example, the power generation apparatus 10 may be turned so that the central axis may move a few degrees, up to, say, 45°, so as to align the central axis with the water or current flow, which may move several degrees between or within cycles, for improved efficiency.

The first and second blade sets or rotors 12, 14, are separated a suitable downstream distance, which testing to date has indicated is about the same distance as the diameter (d) of the blades 18. Other downstream separation distances have been modelled and useful efficiencies have resulted when the separation distances are between about 0.1 d and 10 d.

Nose cones 30 are provided so as to promote or assist flow attachment.

The power generation apparatus 10 may include a pylon 32 upon which the turbine head unit 5 including a generator 34 is mounted. The pylon 32 may be streamlined so as to reduce water flow stresses on the pylon. The pylon 32 may include a releasable mount so as to releasably support the turbine head unit 5. The pylon 32 may also be releasably mounted at its base to a support base unit which is in the form of a base platform and includes recesses for receiving spoil, concrete or other masses to stabilise the base on the ocean floor.

Usable power from the power generation apparatus 10 is in the form of electricity, due to an electrical generator which is provided and includes a generator rotor and a generator stator. The generator rotor is mounted on the turbine shaft (not shown) so as to generate electricity. The electricity is sent to an electrical cabinet (not shown) which processes the electricity, including the steps of, among other things, inversion, conversion, filtering, transforming, so as to connect to a power network in a substantially efficient manner.

The generator may be equipped with a brake to slow the rotor in cases of high current flow.

The turbine may include a control system which may include features included above. Furthermore, the turbine may include a housing and different blade styles and shapes and attitudes, the features of which are included above.

Generators may be of the kind where a rotor spins inside a stator. The generators may be of the standard electromagnet type or the permanent magnet type.

In order to connect the blades to the rotor there may be a cylinder at the blade root which may be inserted into a cooperating bore. The bore may be rotatable about its longitudinal axis so as to rotate the pitch of the blade itself. Alternatively the bore may be fixed relative to a rotor.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A power generation apparatus for generating power from flowing water, the power generation apparatus including:
   a generator;
   a first blade set operatively mounted to the generator for rotation in a selected direction in response to flowing water from a selected direction;
   a second blade set operatively mounted to the generator for rotation, the second blade set being disposed coaxially with, and downstream of or in a wake zone of, the first blade set;
   the generator being adapted to be driven by at least one of the blade sets,
   the generator further being disposed generally coaxially between the first and second blade sets, and wherein the first and second blade sets are operatively coupled together so that the second blade set rotates in the same direction as the first blade set.

2. The power generation apparatus in accordance with claim 1 wherein a clutch or braking arrangement is provided in order to selectively uncouple or operatively disconnect the first blade set from the second blade set.

3. The power generation apparatus in accordance with claim 1 wherein the first and second blade sets directly drive the generator and are mounted on a common rotor shaft so that the blade sets rotate at the same rate.

4. The power generation apparatus in accordance with claim 3 wherein the first blade set and the second blade set each include a plurality of blades, the blades on the first and second blade sets are staggered.

5. The power generation apparatus in accordance with claim 1 wherein the first blade set and the second blade set each include a plurality of blades, an angle of attack of the blades is fixed.

6. The power generation apparatus in accordance with claim 1 wherein the first blade set and the second blade set each include a plurality of blades, an angle of attack of the blades is variable.

7. The power generation apparatus in accordance with claim 1 wherein the first blade set and the second blade set each include a plurality of blades, the blades of both blade sets are identical in number, cross section and length.

8. The power generation apparatus in accordance with claim 1 wherein the generator is mounted on a support pylon extending from a base disposed on the sea floor.

9. The power generation apparatus in accordance with claim 1 wherein the generator is rotatable about a support so as to change an angle of attack of the blade sets.

10. The power generation apparatus in accordance with claim 1 wherein the first blade set and the second blade set each include a plurality of blades, the longitudinal axis of one or more of the blades is splayed rearward by between about 1° to 20°.

11. The power generation apparatus in accordance with claim 1 wherein the first blade set and the second blade set each include a plurality of blades, the blades are bidirectional.

12. A power generation system for generating power from flowing water, the system including a plurality of power generation apparatus according to claim 1.

13. The power generation apparatus in accordance with claim 1 wherein a braking apparatus is provided to inhibit rotation of at least one of the blade sets.

14. The power generation apparatus in accordance with claim 13 wherein the braking apparatus is a fail-safe mechanism.

15. The power generation apparatus in accordance with claim 1 wherein the blade sets are mounted on rotors for rotation, the rotors including rotor shafts.

16. The power generation apparatus in accordance with claim 15 wherein a gearbox including a gearbox output shaft is provided so that rotation speed of the rotor shafts in use can be increased to increase speed of a generator rotor.

17. A method of generating power from flowing water, the method comprising:
   providing a power generation apparatus to a marine or river environment, the power generation apparatus including:
   a generator;

a first blade set operatively mounted to the generator for rotation in a selected direction in response to flowing water from a selected direction;

a second blade set operatively mounted to the generator for rotation, the second blade set being disposed coaxially with, and downstream of or in a wake zone of, the first blade set;

the generator being adapted to be driven by at least one of the blade sets, the generator further being disposed generally coaxially between the first and second blade sets, and wherein the first and second blade sets are operatively coupled together so that the second blade set rotates in the same direction as the first blade set;

allowing water movement through the power generation apparatus to cause the blade sets to rotate; and drawing power from the power generation apparatus.

\* \* \* \* \*

UNITED STATES PATENT AND TRADEMARK OFFICE
CERTIFICATE OF CORRECTION

PATENT NO.        : 8,664,790 B2                                                                 Page 1 of 1
APPLICATION NO.   : 13/266666
DATED             : March 4, 2014
INVENTOR(S)       : Cornelius et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 131 days.

Signed and Sealed this

Twenty-ninth Day of September, 2015

Michelle K. Lee
*Director of the United States Patent and Trademark Office*